(12) United States Patent
Sato

(10) Patent No.: US 11,507,328 B2
(45) Date of Patent: Nov. 22, 2022

(54) INFORMATION PROCESSING DEVICE, INFORMATION PROCESSING METHOD, AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Yutaro Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/207,919

(22) Filed: Mar. 22, 2021

(65) Prior Publication Data

US 2021/0303226 A1    Sep. 30, 2021

(30) Foreign Application Priority Data

Mar. 31, 2020  (JP) .............................. JP2020-062329

(51) Int. Cl.
*G06F 3/12* (2006.01)
*H04N 1/00* (2006.01)

(52) U.S. Cl.
CPC .......... *G06F 3/1204* (2013.01); *G06F 3/1219* (2013.01); *G06F 3/1255* (2013.01); *H04N 1/00411* (2013.01); *H04N 1/00644* (2013.01)

(58) Field of Classification Search
CPC .. B08B 17/00; B27N 3/18; B27N 3/24; B30B 15/0082; B30B 5/06; G06F 3/1204; G06F 3/1219; G06F 3/1255; H04N 1/00411; H04N 1/00644
See application file for complete search history.

(56) References Cited

U.S. PATENT DOCUMENTS

| | | | |
|---|---|---|---|
| 2010/0191620 A1* | 7/2010 | Sunata | G06Q 10/087 399/24 |
| 2019/0107984 A1* | 4/2019 | Kanamori | G06F 3/1285 |
| 2020/0285424 A1* | 9/2020 | Matsuzaka | G06F 3/1226 |

FOREIGN PATENT DOCUMENTS

JP          2000-181641 A       6/2000

* cited by examiner

*Primary Examiner* — Frantz Bataille
(74) *Attorney, Agent, or Firm* — Scully, Scott, Murphy & Presser, PC

(57) ABSTRACT

An information processing device according to aspects of the present disclosures is configured to obtain remaining amount information regarding a remaining amount of the consumable in use from a managed device, and obtain stock amount information regarding a stock amount of an unused consumable from an information source. When the consumable is replenished or replaced, the information processing device determines whether or not the stock amount of the consumable is equal to or less than a threshold value that is defined as a determination criterion based on the remaining amount information and the stock amount information, and displays a consumables management screen displaying a status object indicating a status of the consumable that is determined, in the determining process, that the stock amount is equal to or less than the threshold value.

19 Claims, 14 Drawing Sheets

TABLE #1

| MODEL NUMBER OF CONSUMABLE |
|---|
| LC12BK |
| LC311BK |

FIG. 2A

TABLE #2

| MODEL NUMBER OF CONSUMABLE | CONSUMABLE IDENTIFIER | REMAINING AMOUNT | SERIAL NUMBER OF CONSUMABLE IN USE |
|---|---|---|---|
| LC12BK | aaaaaaaaa | 25 | abc0123456 |
| LC12BK | bbbbbbbbb | 100 | def0123456 |
| LC311BK | ccccccccc | 60 | ghi0123456 |

FIG. 2B

| Devices | Tasks | Consumables | | | | | | — □ ✕ |
|---|---|---|---|---|---|---|---|---|

All consumables

All ▼ ↻

| Groups | Remaining amount (%) | Status | Product category | Consumable category | Model | Model name in use | Serial number in use |
|---|---|---|---|---|---|---|---|
| Warehouse A (2) | 80 | In use | Inkjet MFP | Ink cartridge | LC12BK | M-J591 | abc0123456 |
| Warehouse B (2) | 100 | In stock | Inkjet MFP | Ink cartridge | LC12BK | | |
| | 20 | In use | Inkjet MFP | Ink cartridge | LC311BK | M-J591 | ghi0123456 |
| | 70 | In stock | Laser MFP | Toner cartridge | TN-491C | | |
| | 100 | In stock | Label printer | Roll | RC-S01J2 | | |

FIG. 8

TABLE #3

| DATE | SIZE | NUMBER OF SHEETS |
|---|---|---|
| 2020/2/25 | A4 | 1000 |
| 2020/3/25 | B5 | 500 |
| 2020/4/25 | A4 | 600 |
| 2020/4/25 | LETTER | 500 |
| 2020/5/25 | B5 | 200 |
| 2020/5/25 | POSTCARD | 300 |

FIG. 11A

TABLE #4

| SIZE | NUMBER OF SHEETS |
|---|---|
| A4 | 1600 |
| B5 | 800 |
| LETTER | 500 |
| POSTCARD | 300 |

FIG. 11B

INFORMATION PROCESSING DEVICE, INFORMATION PROCESSING METHOD, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2020-062329 filed on Mar. 31, 2020. The entire subject matter of the application is incorporated herein by reference.

BACKGROUND

Technical Field

The present disclosures relate to an information processing device, an information processing method and a non-transitory computer-readable recording medium storing computer-executable instructions realizing a management program for the information processing device.

RELATED ART

In a technical field of an information processing device capable of communicating with a plurality of printers via a network, there has been proposed a technique to display a list of a plurality of pieces of information regarding the plurality of printers. In such a conventional technique, options (e.g., whether or not a sorter is provided, whether or not a stapler is provided, and whether or not a duplex printing function can be performed) are listed for each printer.

SUMMARY

However, according to the above-mentioned conventional technique, only the presence or absence of the option (e.g., the stapler) is displayed as described above. Therefore, a user cannot grasp, for example, whether or not there is stock of consumables, which is to be replenished, for the option (e.g., the stapler configured to consuming consumables).

According to aspects of the present disclosure, it is desirable to provide a management program, an information processing device, and an information processing method enabling a user to grasp whether there are a sufficient amount of consumables in stock for replacement.

According to aspects of the present disclosures, there is provided a non-transitory computer-readable recording medium for an information processing device of an information processing system. The information processing device includes a processor, a display and a communication device, the information processing system including at least one managed device configured to be managed by the information processing device. The managed device has at least one type of consumable that needs to be replenished or replaced. The information processing device is configured to communicate with the managed device through the communication device. The recording medium contains computer-executable instructions which cause, when executed by the processor, the information processing device to perform managing the at least one type of consumable. The managing includes obtaining, from the managed device, remaining amount information regarding a remaining amount of the consumable in use in the managed device, obtaining stock amount information regarding a stock amount of an unused consumable from an information source in which the stock amount information is recorded, when the consumable is replenished or replaced, determining whether or not the stock amount of the consumable is equal to or less than a threshold value that is defined as a determination criterion based on the remaining amount information and the stock amount information, and displaying a consumables management screen displaying a status object indicating a status of the consumable that is determined, in the determining, that the stock amount is equal to or less than the threshold value.

According to aspects of the present disclosures, there is provided an information processing device included in an information processing system. The information processing system further includes at least one managed device. The information processing device includes a processor, a display and a communication device. The information processing system includes at least one managed device configured to be managed by the information processing device. The managed device has at least one type of consumable that needs to be replenished or replaced. The information processing device is configured to communicate with the managed device through the communication device. The information processing device is configured to perform managing the consumables. The managing includes obtaining, from the managed device, remaining amount information regarding a remaining amount of the consumable in use in the managed device, obtaining stock amount information regarding a stock amount of an unused consumable from an information source in which the stock amount information is recorded, when the consumable is replenished or replaced, determining whether or not the stock amount of the consumable is equal to or less than a threshold value that is defined as a determination criterion based on the remaining amount information and the stock amount information, and displaying a consumables management screen displaying a status object indicating a status of the consumable that is determined, in the determining, that the stock amount is equal to or less than the threshold value.

According to aspects of the present disclosures, there is provided an information processing method of controlling an information processing device included in an information processing system. The information processing system further includes at least one managed device. The information processing device includes a processor, a display and a communication device, the information processing system including at least one managed device configured to be managed by the information processing device. The managed device having at least one type of consumable that needs to be replenished or replaced. The information processing device is configured to communicate with the managed device through the communication device. The information processing method includes managing the consumables. The managing includes obtaining, from the managed device, remaining amount information regarding a remaining amount of the consumable in use in the managed device, obtaining stock amount information regarding a stock amount of an unused consumable from an information source in which the stock amount information is recorded, when the consumable is replenished or replaced, determining whether or not the stock amount of the consumable is equal to or less than a threshold value that is defined as a determination criterion based on the remaining amount information and the stock amount information, and displaying a consumables management screen displaying a status object indicating a status of the consumable that is determined that the stock amount is equal to or less than the threshold value.

BRIEF DESCRIPTION OF THE DRAWINGS

FIG. 2A shows an example of a table #1.

FIG. 2B shows an example of a table #2.

FIG. 8 shows an example of a consumables management screen according to a second embodiment.

FIG. 11A shows an example of a table #3.

FIG. 11B shows an example of a table #4.

DETAILED DESCRIPTION OF THE EMBODIMENTS

Hereinafter, an information processing device, an information processing method, and a non-transitory computer-readable recording medium containing instructions realizing a management program will be described with reference to illustrative embodiments.

(1) First Embodiment

Configuration of Information Processing System

Figure 1:
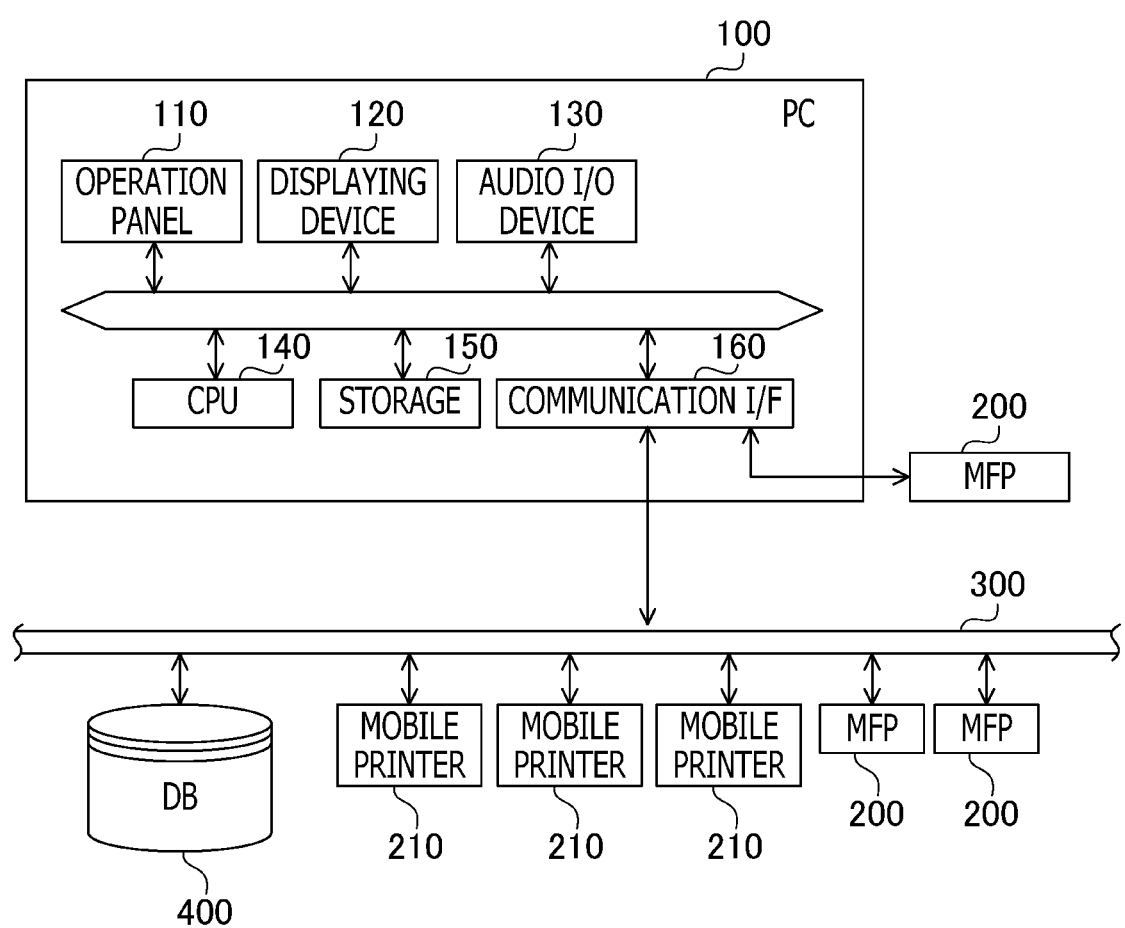
FIG. 1 shows a functional configuration of an information processing system according to first to third embodiments.

FIG. 1 shows a configuration of an information processing system 1 that includes a personal computer (PC) 100, a multifunction peripheral (MFP) 200, and a mobile printer 210. The PC 100 is configured to execute processes based on a management program according to one embodiment of the present disclosures (hereinafter, the PC 100 will also be referred to as a management device). The MFP 200 and the mobile printer 210 are communicatively connected to the PC 100. The MFP 200 and the mobile printer 210 are devices managed by the PC 100 which serves as the management device (hereinafter, such a device managed by the management device will also be referred to as a managed device).

The PC 100 has an operation panel 110, a display 120, an audio I/O device 130, a CPU 140, a storage 150, and a communication I/F 160. It is noted that "I/O" is an abbreviation for Input/Output, "CPU" is an abbreviation for Central Processing Unit, and "I/F" is an abbreviation for an interface.

The operation panel 110 typically includes a keyboard and a mouse. The display 120 includes a display such as a liquid crystal display or an organic EL display, and a drive circuit to drive the display. As the display 120, a display configured to allow input using a touch panel system may be used. In such a case, the user can perform input operations by pressing (touching) the input buttons displayed on the screen. In this case, a transparent touch panel superimposed on the screen of the display functions as the operation panel 110.

The audio I/O device 130 includes a microphone, a speaker, and audio processing circuits. The CPU 140 is configured to execute various application programs (hereinafter abbreviated as "App"), including the management program and firmware according to the present embodiment.

The storage 150 may include a ROM (Read Only Memory), a RAM (Random Access Memory), an HDD (Hard Disk Drive), an SSD (Solid State Drive), an optical disk drive, or the like. The ROM stores the firmware and various data. The RAM is used as a primary storage device where applications and data are temporarily stored when the CPU 140 executes various processes.

The storage 150 stores an OS (Operating System), the management program according to the present embodiment, and various other applications and data. The various applications can be downloaded from an external server (not shown) via the communication I/F 160. The applications can also be downloaded from the external device (not shown) via a USB (Universal Serial Bus) I/F provided to the PC 100.

The management program according to the present embodiment is an application configured to display and manage the status of functions (e.g., a printer function, a scanner function, and a facsimile function, etc.) provided by the MFP 200 and the mobile printer 210 per each device.

The communication I/F 160 is a device having a function to connect the PC 100 to a communication network 300 and a function to connect external devices to the PC 100. Since the communication network 300 is assumed to be a wired or wireless LAN (Local Area Network) in this embodiment, the communication I/F 160 has a LAN I/F (Local Area Network Interface) or a WLAN I/F (Wireless LAN Interface). It should be noted that both the wired LAN and the wireless LAN could exist simultaneously, and in such a case, the communication I/F 160 includes both the LAN I/F and the WLAN I/F. The communication network 300 is not limited to the LAN, but may be of any other network type such as the Internet. The interface for directly connecting the external devices to the PC 100 includes the USB I/F and the Bluetooth® I/F. The multiple MFPs 200 and the mobile printer 210 can be connected to the communication network 300 in this embodiment.

The PC 100 is configured to access the database (DB) 400. In the following description, the database is abbreviated as the "DB." The DB 400 is a data storage area accessible via the communication network 300. The DB 400 is configured, for example, by a NAS (Network Attached Storage). The information registered in the DB 400 can be retrieved by various devices that can access the DB 400 via the communication network 300.

Table #1 shown in FIG. 2A and Table #2 shown in FIG. 2B are registered in the DB 400. Table #1 is a table indicating types of the consumables, while Table #2 is a table indicating the remaining amount of each consumable. Tables #1 and #2 are used in processes described later.

Overview of Management Process

Next, an overview of a management process performed in the PC 100 will be described. When the management process is performed in the PC 100, the PC 100 obtains remaining amount information indicating the remaining amount of the consumables currently in use in the managed device from the managed device (e.g., the MFP 200 and the mobile printer 210) under the management of the PC 100. The remaining amount information is obtained from the managed device via the communication I/F 160. Further, the PC 100 obtains stock information regarding the stock amount of unused consumables from an information source (e.g., the DB 400) in which the stock amount information is registered.

When the consumables are replenished or replaced based on the above remaining amount information and the above stock amount information, the PC 100 determines whether the stock amount of consumables is equal to or less than a threshold value set as a determination criterion. When it is determined that there are consumables of which stock amount is equal to or less than the threshold value, the PC 100 displays information indicating that the stock amount of the consumables is insufficient on the display 120. Therefore, the user can grasp which consumables have insufficient stock by seeing the information displayed on the display 120.

Management Screen

Figure 3:
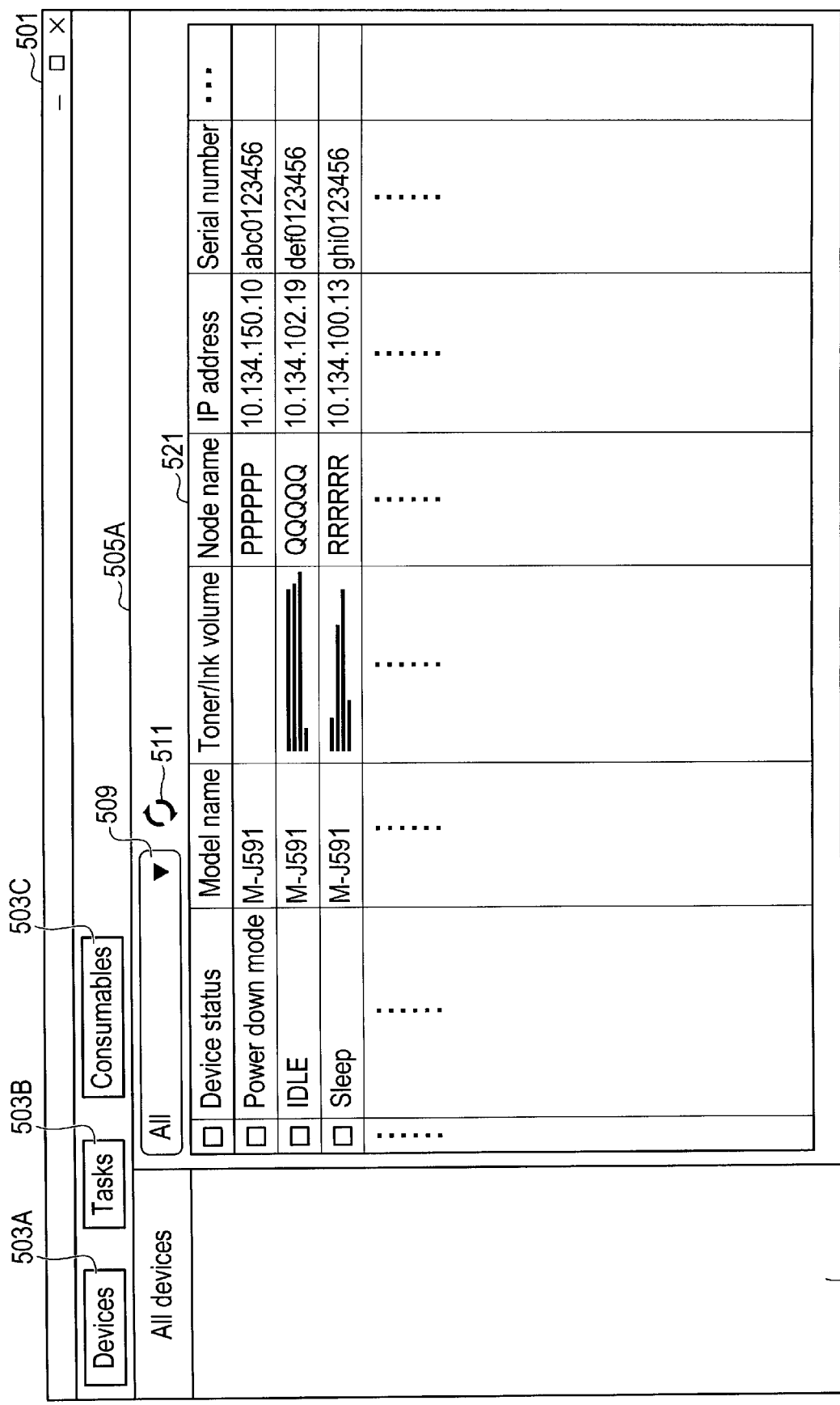
FIG. 3 shows an example of a device management screen according to the first embodiment.

When the above-described management process is executed on the PC 100, the management screen 501 as shown in FIG. 3 is displayed on the display 120 of the PC 100. The management screen 501 has multiple pages that can be switched by operating tabs 503A, 503B and 503C. FIG. 3 illustrates a device management screen 505A that is displayed when the tab 503A is selected. On the device management screen 505A, multiple display objects including a display target selection field 509, an information update button 511, and a device information table 521 are arranged. On a left side of the device management screen 505A, a filtering operation field 515 is provided.

The device information table 521 is a table with n lines×m rows display fields. The device information table 521 contains the same number of display lines as the n managed devices under the control of the PC 100. In each display line of the device information table 521, m items of information are displayed. As examples of the m items of information, "Device status," "Model name," "Toner/Ink volume," "Node name," "IP address," and "Serial number" are indicated in FIG. 3. It is noted that other items may optionally or alternatively be displayed. In the device information table 521, an operation on the display field of each item name of the m items (e.g., an operation of clicking on a display field of each item name on the operation panel 110 with the mouse by a user operation: hereinafter, such operations will be referred to as click operations), contents of the row subjected to the operation can be used as a sort key to sort the n display lines in an ascending or descending order.

In the display target selection field 509, the managed device subjected to be displayed in the management screen 501 can be selected. Concretely, since "All" is selected in the example shown in FIG. 3, all the managed devices are displayed in the device information table 521. In the display target selection field 509, statuses such as "Normal," "Warning," and "Abnormal" can be selected. In such a case, the managed devices with the selected status are displayed in the device information table 521.

Figure 4:
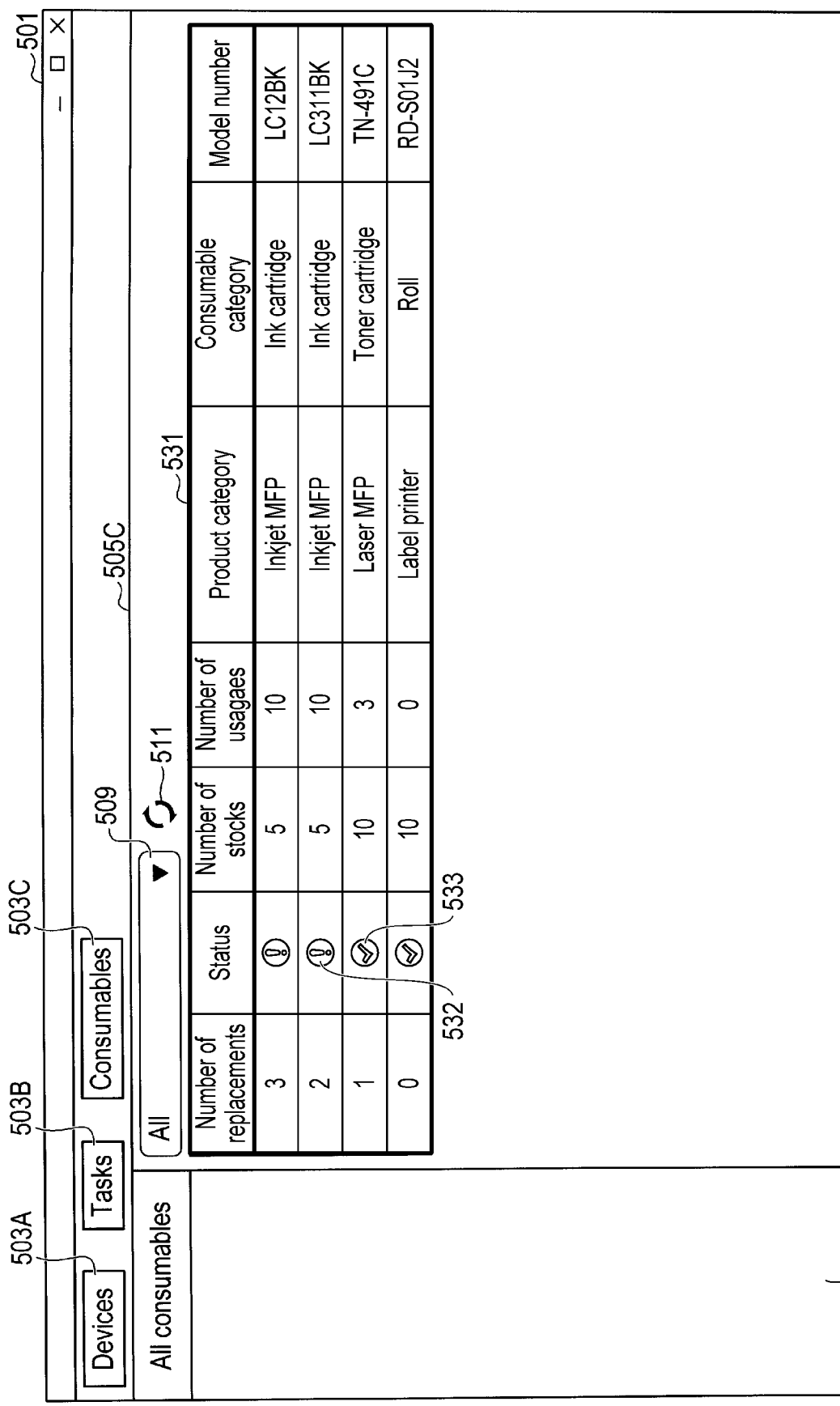
FIG. 4 shows an example of a consumables management screen according to the first embodiment.

The information displayed on the management screen 501 is updated to the latest information periodically (e.g., every five minutes). Further, the information displayed on the management screen 501 can be manually updated to the latest information by operating the information update button 511. In the management screen 501 shown in FIG. 3, when the tab 503C is selected by a user operation, the page displayed on the management screen 501 is switched to the page corresponding to the tab 503C, and the consumables management screen 505C is displayed as shown in FIG. 4.

In the consumables management screen 505C, the consumable information table 531 is also arranged as a display object, in addition to the display target selection filed 509 and the information update button 511 described above. The consumable information table 531 is a table having display fields of k lines×j rows. The consumable information table 531 has display lines of which number is the same as the number of k types of consumables used in the managed devices under the management of the PC 100. In each display line of the consumable information table 531, j items of information are displayed. The j items of information include "Number of required replacements," "Status," "Number of Stocks," "Number of Usages," "Product Category," "Consumable Category," and "Model Number" as shown in FIG. 4. It is noted that other items may be displayed optionally or alternatively.

Among the display lines corresponding to the j items in the row of "Number of Replacements Required," the amount (i.e., the number) of consumables, among the consumables in use in the managed devices, of which the remaining amount is less than or equal to a threshold value are displayed. In other words, the amount of consumables that need to be replaced or replenished is displayed in the row of "Number of Replacements Required." In the row of "Number of Stock," the amount of stocked consumables that are available for replacement or replenishment is displayed. In the row of "Number of Usages," the amount of consumables that are currently in use in the managed devices is displayed.

In the row of "Status," a status object 532 representing a warning status and a status object 533 representing a normal status are displayed. When the amount of consumables in stock is determined to be equal to or less the threshold value when the consumables are replenished or replaced, the status objects 532 indicating the warning status is displayed. When the consumables are replenished or replaced, and it is determined that the amount of consumables in stock will not fall below the threshold, the status object 533 representing the normal status is displayed. According to the present embodiment, a value obtained by subtracting the "Number of Stocks" from the "Number of Replacements Required" is less than or equal to a certain threshold (e.g., less than or equal to 5), the status object 532 representing the warning status is displayed. When the value obtained by subtracting the "Number of Stocks" from the "Number of Replacements Required" is not less than or equal to the threshold (i.e., more than threshold), the status object 533 representing the normal status is displayed.

In the consumable information table 531, the k display lines are arranged in the order where the smaller the value of "Number of Consumables in Stocks"−"Number of Replacements Required" is, the higher the line is arranged, in a default display state. In this way, the consumables that need to be replenished are displayed at a higher position on the list (i.e., with higher priority). It is noted, however, the display order of the k display lines can be switched between ascending order and descending order by clicking on the display field of each of j items, similarly as in the device information table 521 described above.

Figure 5:
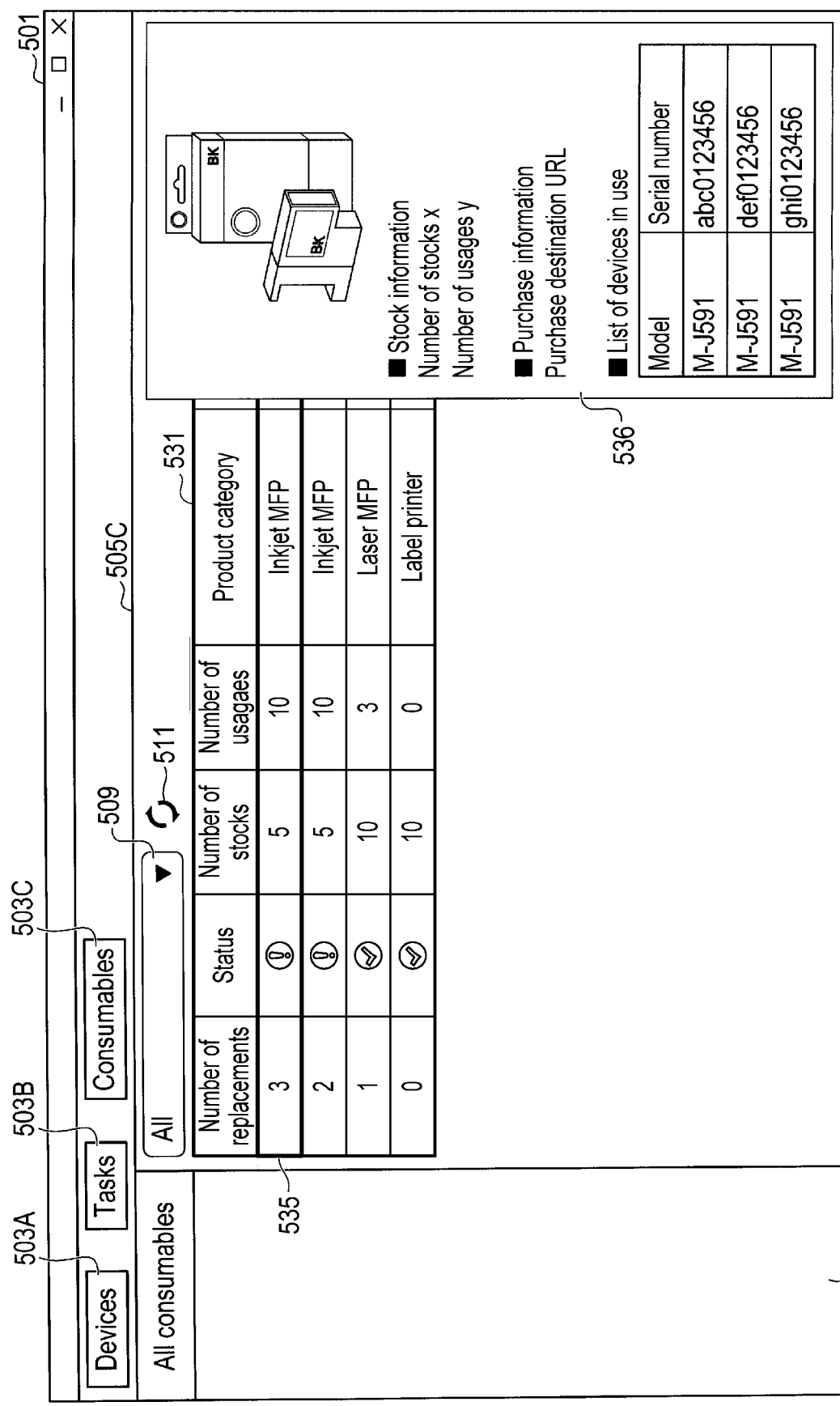
FIG. 5 shows an example of a detailed screen according to the first embodiment.

When the user performs the user operation (e.g., a clicking operation) to select one display line in the consumable information table 531, a frame 535 indicating that the line is in focus is displayed on the display line subjected to the selection as shown in FIG. 5. Further, a detailed screen 536 regarding the consumable corresponding to the selected line is displayed on the display screen. The detailed screen 536 displays an appearance image representing the consumable and its package, stock information including the amount of consumables in stock and the amount of consumables in use, a purchase destination URL where the consumables can be purchased, and a list of the managed devices that are using the consumables.

Figure 6:
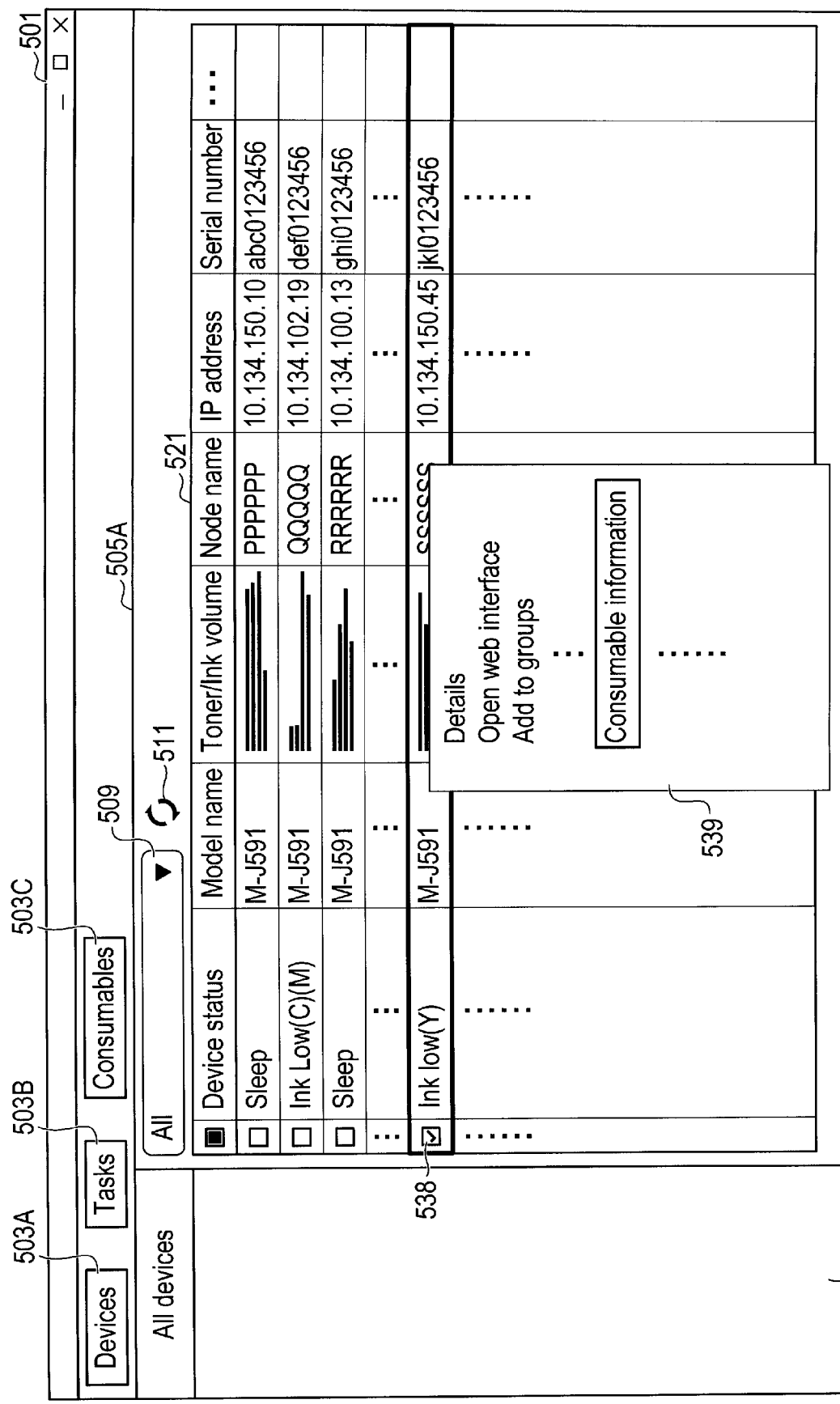
FIG. 6 shows an example of an operation for displaying the detailed screen from the device management screen.

The detailed screen 536 can also be displayed by the operation in the device information table 521 described above. As shown in FIG. 6, when the user selects one device to be managed in the device information table 521 by checking a check box 538, and performs a particular user operation in that state, a context menu 539 is displayed. By selecting "Consumable Information" contained in that context menu 539, the detailed screen 536 as shown in FIG. 5 is displayed.

Consumable Information Table Displaying Process

Figure 7:
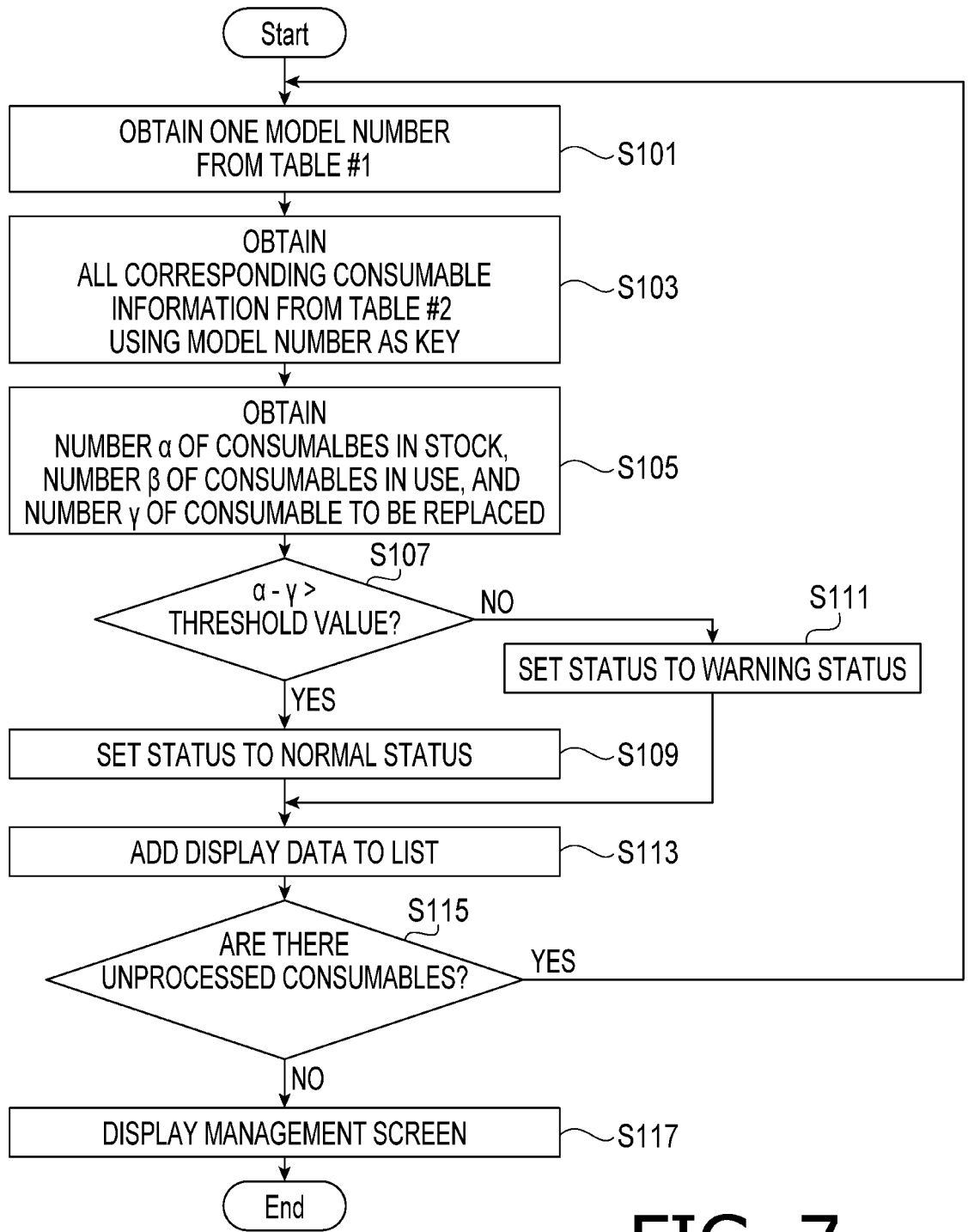
FIG. 7 shows a flowchart illustrating a consumable information table displaying process according to the first embodiment.

Next, a consumable information table displaying process executed by the PC 100 will be described referring to FIG. 7. The consumable information table displaying process shown in FIG. 7 is a process of displaying the consumable information table 531. When the consumable information table displaying process is started, the PC 100 obtains one model number of the consumables from Table #1 shown in FIG. 2A (S101). Then, using the model number obtained in S101 as a key, the PC 100 obtains all the pieces of consumable information corresponding to the model number from Table #2 shown in FIG. 2B (S103).

Next, the PC 100 obtains the number α of consumables in stock, the number β in use, and the number γ of replacements required that need to be replaced (S105). Then, the PC 100 determines whether a value obtained by subtracting the number γ of replacements required from the number α of stocks is greater than a threshold value (S107). When it is determined that the value obtained by subtracting the number γ of replacements required from the number α of consumables in stock is greater than the threshold value (S107: YES), the PC 100 sets the status of the consumables as a normal status (S109). On the other hand, when it is determined that the value obtained by subtracting the number γ of replacements required from the number α of consumables in stock is equal to or less than the threshold value (S107: NO), the PC 100 sets that the status of the consumables as a warning status (S111). In S109 and S111, which of the object 532 and object 533 is to be displayed in the "Status" row of the consumable information table 531 is determined.

After completing S109 or S111, the PC 100 adds the display data, which corresponds to the consumables subjected to process, to the list (S113). Next, the PC 100 determines whether there are any unprocessed consumables (S115). When it is determined that there are any unprocessed consumables (S115: YES), the PC 100 returns to S101. In this way, processes S101-S115 are repeatedly executed while it is determined that there are unprocessed consumables in S115.

On the other hand, when it is determined that there are no unprocessed consumables (S115: NO), the screen containing the consumable information table 531 (i.e., the management screen 501 including the consumables management screen 505C) is displayed. In this way, on the display 120, the management screen 501 including the status objects 532 and 533 as shown in FIG. 4 is displayed. After completing S117, the consumable information table displaying process shown in FIG. 7 is terminated.

Effects

As described above, according to the above-described PC 100, when the consumables are replenished or replaced, the status objects 532 and 533 representing the status of the consumables are displayed in the consumables management screen 505C displayed on the display 120. For example, when it is determined that the stock amount of the consumables (more concretely, a value obtained by subtracting the amount of required replacements from the stock amount) is equal to or less than a threshold value, the status object 532 is displayed, and when it is determined that the stock amount of the consumables is more than the threshold value, the status object 533 is displayed. Therefore, the user can see the status objects 532 and 533 displayed on the consumables management screen 505C and grasp the consumables of which stock amount is insufficient.

According to the present embodiment, in the consumable information table 531 of the consumables management screen 505C, the display lines (which are examples of consumable display area according to the present disclosures) of which number is equal to the amount (i.e., the number) of at least one type of consumables are provided. In each of the display lines for respective consumables of the consumable information table 531, the status object 532 or 533 is displayed. Therefore, when the status objects 532 and/or 533 are displayed, the user can grasp the consumables for which the stock amount is insufficient on a consumable basis.

Further, in this embodiment, in the display line of the consumable information table 531, the amount of consumables that are in use in the managed device and need to be replaced (i.e., amount of required replacements), the amount of unused consumables in stock, and the number of consumables in use in the managed device with respect to the consumables corresponding to the display line are displayed. Therefore, the user can grasp the above amount of required replacements, the amount of consumables in stock, and the amount of consumables in use by viewing the information displayed on the consumables management screen 505C.

Further, according to the present embodiment, the display order of the plurality of display lines included in the consumable information table 531 of the consumables management screen 505C is determined such that the consumables with a smaller post-replacement stock count, which is calculated by subtracting the amount of required replacements from the stock count, are displayed with higher priority. Therefore, the consumables that are highly urgent in terms of stock management can be easily identified.

According to the present embodiment, when the detailed screen 536 (see FIG. 5) is displayed by the user operation on the consumables management screen 505C, the appearance image of the consumable is displayed on the detailed screen 536. Therefore, by looking at the appearance image, the user can know the appearance of the consumable which is to be selected.

According to the present embodiment, a list of the managed devices in which the consumables are being used is displayed on the detailed screen 536. Therefore, the user can know which managed device uses the consumables by looking at the list of the managed devices.

According to the present embodiment, the amount of consumables in stock and the amount of consumables in use are displayed on the detailed screen 536. Therefore, the user can know the number of consumables in stock and the number of consumables in use.

Further, according to the present embodiment, the display 120 is configured to display one page that is selected from among a plurality of pages that can be switched by operating the tabs 503A, 503B and 503C, and the consumables management screen 505C is displayed on any one of the plurality of pages. Thus, the user can easily switch between displaying the consumables management screen 505C and displaying one of the other screens.

Further, according to the present embodiment, when the display line corresponding to a specific managed device is selected on the device management screen 505A and a particular user operation is performed on the device display area, the detailed screen 536 corresponding to the consumables used in the managed device corresponding to the specific device display area subjected to the user operation is displayed. Therefore, the user can make the detailed screen 536 displayed by operating on the device management screen 505A.

(2) Second Embodiment

Next, a second embodiment according to the present disclosures will be described. Each of the second and subsequent embodiments will be described focusing on differences with respect to the first embodiment, and descriptions of matters equivalent to the first embodiment will be omitted.

Management Screen

In the second embodiment, information displayed on the consumables management screen 505C is different from that of the first embodiment. Concretely, when a page corresponding to tab 503C is to be displayed in the management screen 501, a consumables management screen 505C as shown in FIG. 8 is displayed. On the consumables management screen 505C, a consumable information table 541 in a form different from that of the first embodiment is arranged.

The consumable information table 541 is a table with display fields of p lines×q rows. The consumable information table 541 contains the same amount of display lines as the amount (the number) of consumables in use and unused consumables in stock in the managed devices under the management of the PC 100. That is, while the first embodiment is configured to display information on consumables for each of the k types of consumables, the second embodiment is configured to display information on individual consumables. In other words, in the first embodiment, even if there are multiple consumables with the same model number, the multiple consumables are treated as a single display target, while in the second embodiment, if there are multiple consumables with the same model number, each of the multiple consumables is treated as an individual display target.

Each display line of the consumable information table 541 shows the information for q items. As an example of the q items, "Remaining Amount (%)," "Status," "Product category," "Consumable category," "Model number," "Model name in Use," and "Serial number in Use" are shown in FIG. 8. It is noted that other items may further be displayed in the display line optionally or alternatively. Among display rows corresponding to the q items, the "Remaining amount" row displays the remaining amount of each consumable. The "Status" row indicates whether the consumable corresponding to each display line is "In use" or "In stock." For consumables of which "Status" is "In Use," the "In Use Model Name" row and the "In Use Serial Number" row display information about the managed device that is using the consumable.

In the example shown in FIG. 8, filtering items "Warehouse A" and "Warehouse B" are displayed in the filtering operation field 515 displayed on the left side of the consumables management screen 505C. The filtering items displayed here are used to allow the user to arbitrarily set conditions and selectively display only the consumables that meet the conditions. For example, when "Warehouse A" in the filtering operation field 515 is selected by the user operation, only the consumables stored in the "Warehouse A" will be displayed on the consumables management screen 505C. This makes it easy to determine which consumables (e.g., consumables stored in "Warehouse A") meet a specific condition from among a large amount of consumables.

Figure 9:
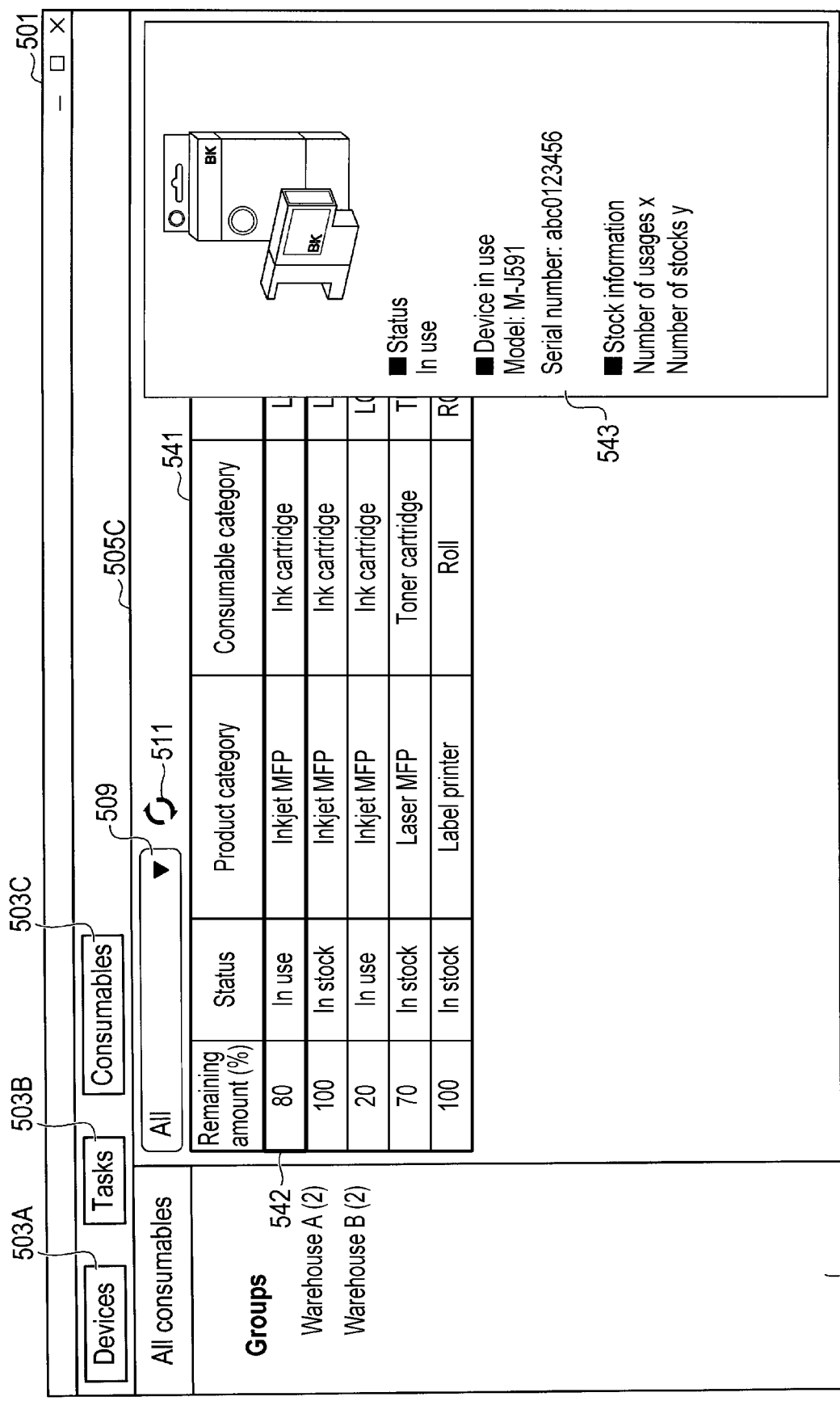
FIG. 9 shows an example of a detailed screen according to the second embodiment.

When the user performs a user operation (for example, by clicking) to select one display line of the consumable information table 541, a frame 542 indicating that the selected line is in focus is displayed on the selected line, and a detailed screen 543 regarding the consumables corresponding to the selected display line is displayed as shown in FIG. 9. The detailed screen 543 includes an appearance image representing the consumable and its package, the status described above, information regarding the managed device in which the consumable is being used (e.g., the model name and its serial number), and stock information including the amount of consumables in use and the amount of stocks is displayed.

Consumable Information Table Displaying Process

Figure 10:
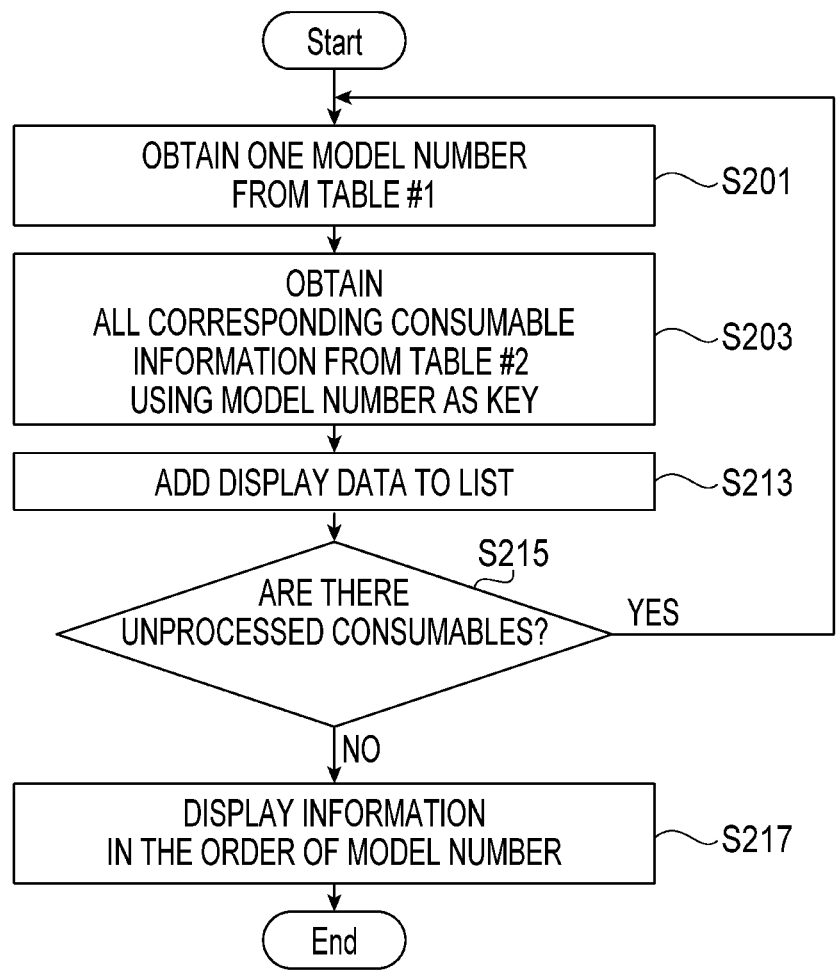
FIG. 10 shows a flowchart illustrating a consumable information table displaying process according to the second embodiment.

Next, the consumable information table displaying process executed by the PC 100 will be described referring to FIG. 10. The consumable information table displaying process shown in FIG. 10 is a process of displaying the consumable information table 541. When the consumable information table displaying process is started, the PC 100 obtains one model number of the consumables from Table #1 shown in FIG. 2A (S201). Then, using the model number obtained in S201 as a key, the PC 100 obtains all the consumables information corresponding to the model number from Table #2 shown in FIG. 2B (S203).

Next, the PC 100 adds display data corresponding to the consumables to be processed to the display list (S213). Then, the PC 100 determines whether there are any unprocessed consumables (S215). When it is determined that there are any unprocessed consumables (S215: YES), the PC 100 returns to S201. Thus, steps S201-S215 are repeatedly executed while it is determined that there are unprocessed consumables in S215.

On the other hand, when it is determined that there are no unprocessed consumables (S215: NO), the information constituting the consumable information table 541 is displayed on the screen in the order of model number (S217). Thereby, a screen containing the consumable information table 541 (i.e., the management screen 501 including the consumables management screen 505C) is displayed on the display 120. After completing S217, the consumable information table displaying process shown in FIG. 10 is terminated.

Effects

The PC 100 according to the second embodiment as described above has the same effects as those of the first embodiment. That is, a text object indicating the remaining amount is displayed in the consumable information table 541 as the status object indicating the status of the consumables. Therefore, the user can see the status object (i.e., the text object) displayed on the consumables management screen 505C to grasp the consumables of which stock amount is insufficient.

(3) Third Embodiment

In a third embodiment, the type of consumables is different from that in the first and second embodiments. Concretely, in the third embodiment, printing sheets having different sizes will be illustrated as examples of the consumables. According to the third embodiment, Table #3 illustrated in FIG. 11A and Table #4 illustrated in FIG. 11B are registered in the DB 400. Table #3 is a table for managing a purchase history of sheets. Table #4 is a table for managing the total number of sheets purchased for each size of sheet. Table #3 and Table #4 are used in a process described below.

Management Screen

Figure 12:
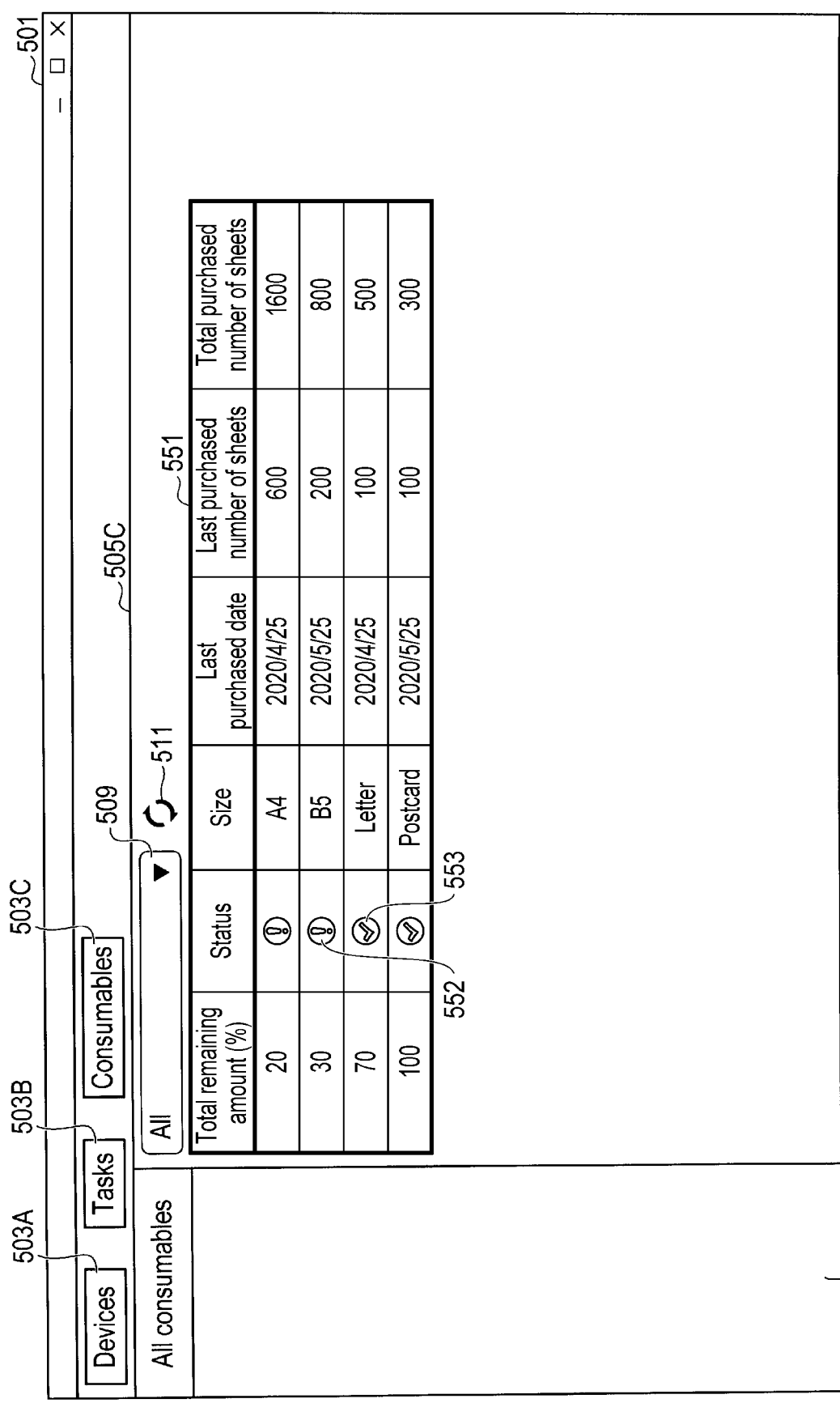
FIG. 12 shows an example of a consumables management screen according to a third embodiment.
Figure 13:
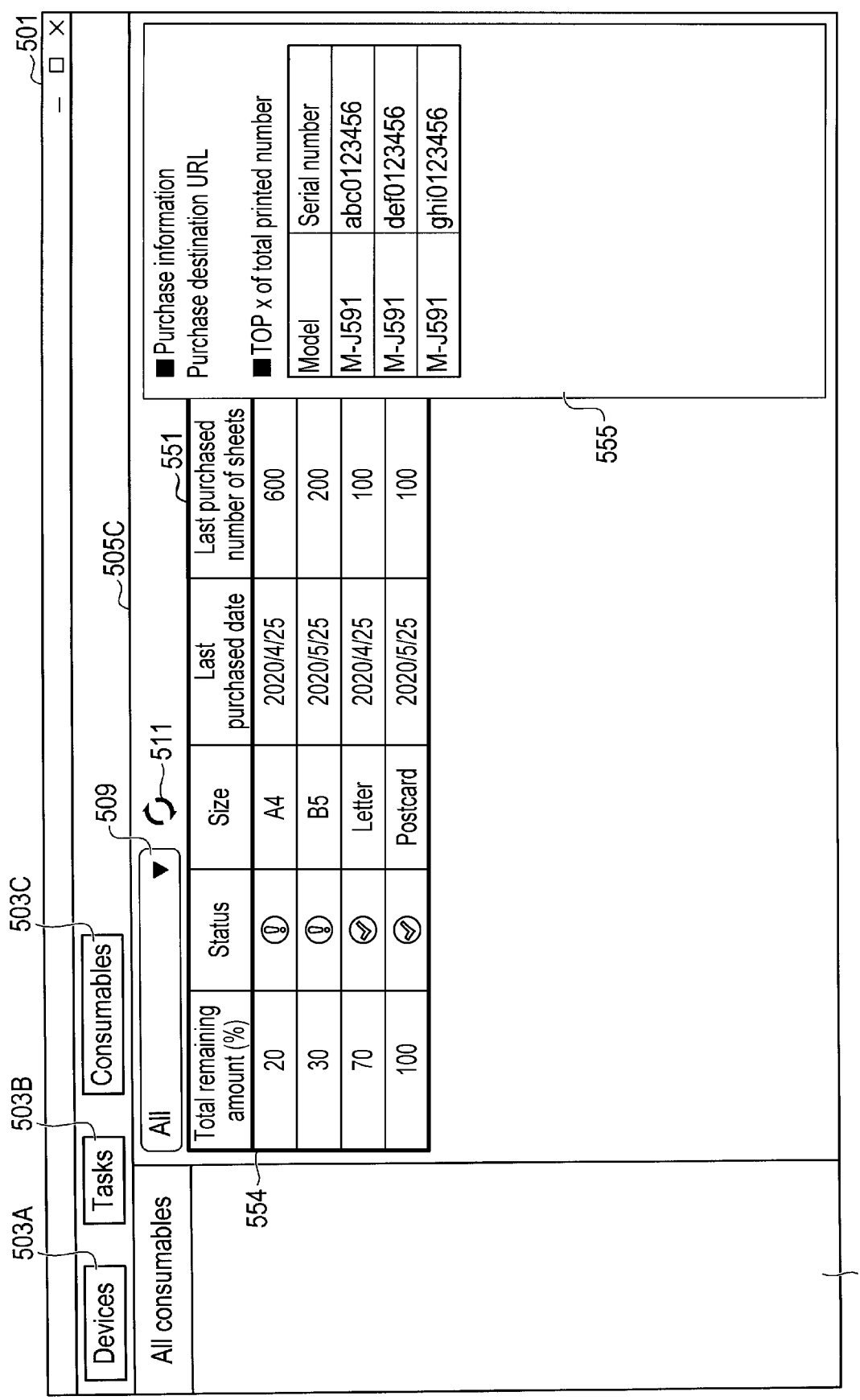
FIG. 13 shows an example of a detailed screen according to the third embodiment.

In the third embodiment, the information displayed on the consumables management screen 505C is different from that in the first and second embodiments. Concretely, in the management screen 501, when a page corresponding to the tab 503C is displayed, a consumables management screen 505C as shown in FIG. 12 is displayed. On the consumables management screen 505C, a consumable information table 551 having a form different from the first and second embodiments is arranged.

The consumable information table 551 is a table with r lines×s rows of display fields. The consumable information table 551 contains the same number of display lines as the r types of sheet sizes currently in use in the managed devices under the management of the PC 100. Each display line of the consumable information table 551 displays information for s items. FIG. 12 shows an example of s items, which are "Total remaining amount (%)," "Status," "Size," "Last purchased date," "Last purchased number of sheets," and "Total purchased number of sheets." It is noted that other items may also be displayed. The "Last purchased number of sheets" indicates the number of sheets purchased on the last purchased date.

Among the display lines corresponding to the r items, the row of "Total remaining amount (%)" displays the total remaining amount of each consumable. In the "Status" row, a status object 552 representing a warning status or a status object 553 representing a normal status is displayed. The status object 552 representing the warning status is displayed, for example, when the total remaining amount is 30% or less, and the status object 553 representing the normal state is displayed when the total remaining amount is greater than 30%.

When a user operation is performed to select one display line in the consumable information table 551 (e.g., a click operation), a frame 554 indicating that the display line is in focus is displayed for the selected display line, and a detailed screen 555 regarding the printing sheet of the size corresponding to the display line is displayed. The detailed screen 555 displays information on a purchase destination URL where the printing sheets can be purchased and the information on the top x managed devices (in this embodiment, the top three managed devices) in terms of the total number of printed sheets.

Consumable Information Table Displaying Process

Figure 14:
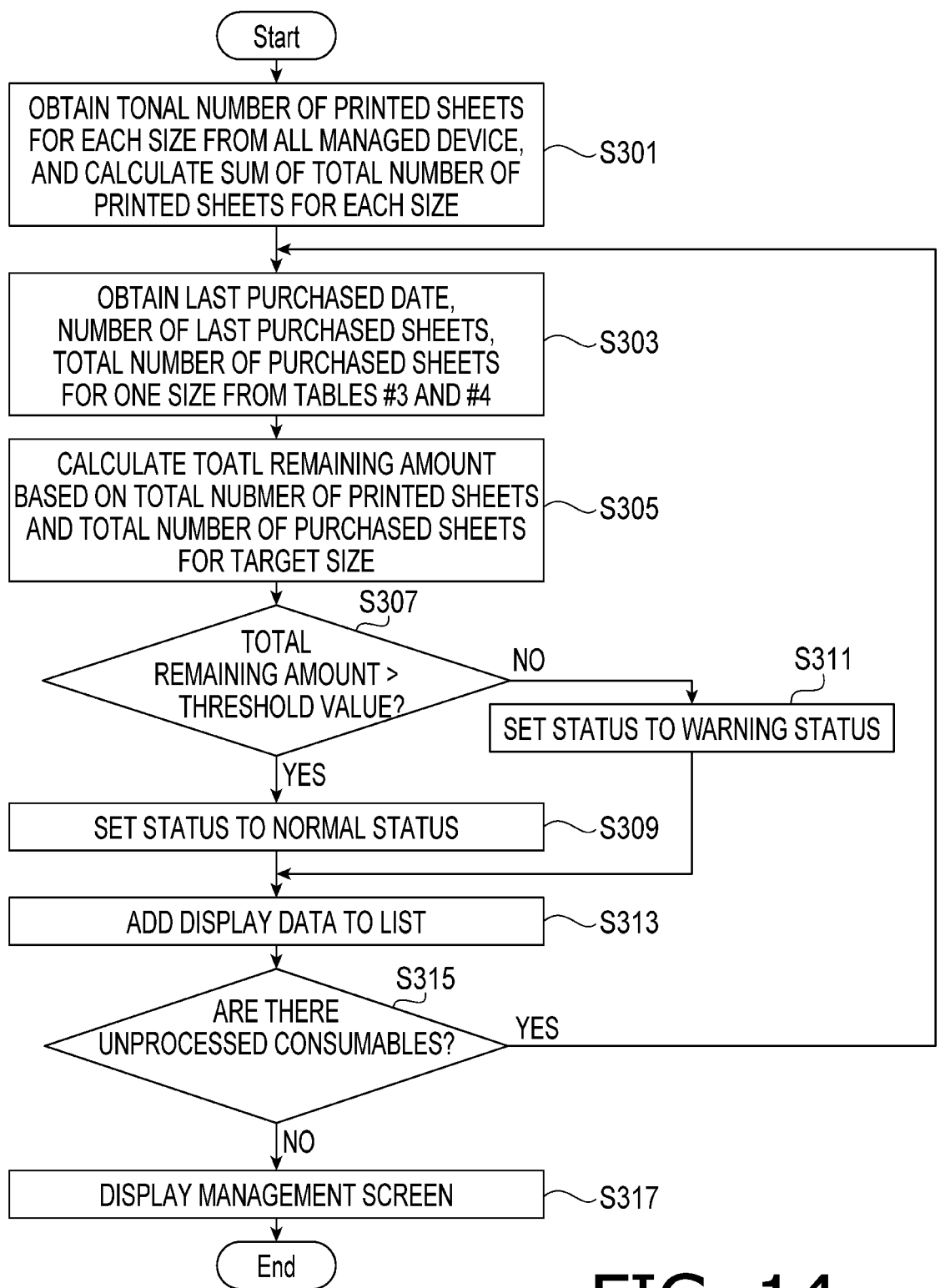
FIG. 14 shows a flowchart illustrating a consumable information table displaying process according to the third embodiment.

Next, the consumable information table displaying process performed by the PC 100 will be described referring to FIG. 14. The consumable information table displaying process shown in FIG. 14 is a process of displaying the consumable information table 551. When the consumable information table displaying process is started, the PC 100 obtains the total number of sheets printed for each size from all the managed devices and sums them for each size (S301).

Then, the PC 100 obtains the last purchase date, the last number of sheets purchased, and the total number of sheets purchased for one size from Table #3 shown in FIG. 11A and Table #4 shown in FIG. 11B (S303). Then, the PC 100 calculates the total remaining amount from the total number of sheets printed and the total number of sheets purchased for the corresponding size (S305). Then, the PC 100 determines whether the total remaining amount is greater than a threshold value (S307). When it is determined that the total remaining amount is greater than the threshold value (S307: YES), the PC 100 sets the status of the consumables (printing sheets) to be normal (S309). When it is determined that the total remaining amount is equal to or less than the threshold value (S307: NO), the PC 100 sets the status of the consumables to "Warning" (S311). In S309 and S311, which of the status objects 552 and 553 is to be displayed in the "Status" row of the consumable information table 551 is set.

After completing S309 or S311, the PC 100 adds display data corresponding to the consumables (printing paper) to be processed to the list (S313). Next, the PC 100 determines whether there are unprocessed consumables (S315). The "unprocessed consumables" in S315 refers to "printing sheets of an unprocessed size." When it is determined that there are unprocessed consumables (S315: YES), the PC 100 returns to S303. In this way, steps S303-S315 are repeatedly executed while it is determined that there are unprocessed consumables in S315.

On the other hand, when it is determined that there are no unprocessed consumables (S315: NO), the screen containing the consumable information table 551 (i.e., the management screen 501 including the consumables management screen 505C) is displayed. As a result, the management screen 501 including the status objects 552 and 553 as shown in FIG. 12 is displayed on the display 120. After completing S317, the consumable information table displaying process shown in FIG. 14 is terminated.

Effects

The PC 100 according to the third embodiment as described above has the same effects as those of the first and second embodiments. That is, in the consumable information table 551, the status objects 552 and 553 representing the status of the consumables are displayed. Therefore, the user can grasp the consumables for which the amount of stock is insufficient by looking at the status objects 552 and 553 displayed on the consumables management screen 505C.

(4) Other Embodiments

For example, in the above embodiment, the MFP 200 and the mobile printer 210 are illustrated as examples of the managed device, but the managed device should not be limited to the MFP 200 or the mobile printer 210. As the managed device, various devices configured to allow attachment of optional items can be assumed. Examples of such a managed device include a variety of network devices, for example, printing devices such as printers, facsimile machines, and MFPs, image input devices such as scanners, network cameras, and MFPs, image communication devices such as facsimile machines and MFPs, communication devices such as smartphones, tablet terminals, cell phones, and network routers, information server devices such as network storage, cutting plotters (cutting machines) and the like. Further, the managed devices may be home appliances equipped configured to communicate via a network (so-called network home appliances) which include, for example, sewing machines, VCRs, HDD/DVD recorders, home game machines, radios, washing machines, clothes dryers, microwave ovens, ovens, refrigerators, rice cookers, electric pots, dishwashers, dryers, air conditioners, heaters, dehumidifiers, humidifiers, air purifiers, lighting devices, toilet seats for washing, etc.

In the above embodiment, the DB 400 is a data storage area accessible via the communication network 300, but a part of or all of the storage area equivalent to the DB 400 may be configured as a storage area provided in the PC 100. In such a case, the PC 100 can access the storage area equivalent to the DB 400 not via (i.e., directly) the communication network 300. When the storage area equivalent to the DB 400 is provided in the PC 100, if a file server function is implemented to the PC 100, a device external to the PC 100 (e.g., the MFP 200 and the mobile printer 210) can access the storage area in the PC 100 via the communication network 300.

A plurality of functions realized by one component illustrated in the above embodiment may be realized by a plurality of components. A single function realized by one component illustrated in the above embodiment may be realized by multiple components. A plurality of functions realized by a plurality of components illustrated in the above embodiments may be realized by a single component. A single function realized by the plurality of components illustrated in the above embodiment may be realized by a single component. Some of the components illustrated in the above embodiments may be omitted. At least a part of the configuration illustrated in one of the above embodiments may be added to or replaced with the configuration illustrated in the above embodiments other than that one embodiment.

(5) Complement

Complementary Information

As is apparent from the illustrative embodiments described above, the management program, the information processing device, and the information processing method according to the present disclosures may further be equipped with following configurations.

(A) In the displaying process, the consumables management screen may be provided with the same number of consumables display areas equal to the number of at least one type of consumables. The consumables display areas may be configured to display consumable information indicating the consumable corresponding to the consumables display area and a status object indicating the status of the consumable corresponding to the consumables display area.

By having the processing unit of the information processing device execute the management process with the management program configured in this way, the status object is displayed in the consumable display area prepared for each consumable. Therefore, when the status object is displayed, the user can grasp the consumables for which the stock is insufficient on a consumable unit basis.

(B) The consumables display area may be configured such that at least one item selected from the amount of consumables that are in use in the managed device and need to be replaced, the amount of unused consumables in stock, the amount of consumables in use in the managed device, the remaining amount of consumables in use in the managed device, and the model name of the managed device in which the consumables are in use is displayed in association with the consumables.

By having the processing unit of the information processing device perform the management process using the management program configured in this way, the user can see the information displayed on the consumables management screen and understand the amount of consumables that need to be replaced and are in use in the managed device, the number of unused consumables in stock, the amount of consumables in use in the managed device, the remaining amount of consumables in use in the managed device, or the model name of the managed device that is using the consumables.

(C) In the displaying process, when the same number of consumable display areas as the plurality of consumables are displayed on the consumables management screen, the display order of the plurality of consumables display areas may be configured so that the consumables with less stock after replacement (i.e., the number of stock minus the number of required replacements) or less remaining amount are displayed with higher priority.

By having the processing unit of the information processing device execute the management process using the management program configured in this way, the consumables with the lower amount of stocks after replacement or the remaining amount will be displayed with higher priority, making it easier to grasp the consumables that are more urgent for stock management.

(D) In the displaying process, when a particular user operation is performed for a specific consumable display area on the consumables management screen, a detailed screen showing the details of the consumable corresponding to the targeted consumable display area may be displayed. The detailed screen may be configured to display an external image representing the appearance of the consumables.

With the management program configured in this way, by having the processing unit provided to the information processing device execute the management process, when the detailed screen is displayed by a user operation on the consumables management screen, an appearance image is displayed on the detailed screen. Therefore, the user can know the appearance of the consumables to be selected by looking at the appearance image.

(E) The detailed screen may be configured to display a list of managed devices that are using the consumables. With the management program configured in this way, a list of the managed devices that are using the consumables is displayed on the detailed screen. Therefore, the user can know in which device the consumables are being used by looking at the list of the managed devices.

(F) The detailed screen may be configured to display the amount of stocks and the amount of usages. By having the processing unit of the information processing device execute the management process with the management program configured in this way, the user can know the amount of stocks and the amount of usages.

(G) In the displaying process, the display may be configured to display one page to be selected from among a plurality of pages, and the one page to be displayed may be switchable by a user operation. The consumables management screen may be configured to be displayed on any one of the plurality of pages.

By having the processing unit of the information processing device execute the management process using the management program configured in this way, it becomes easy to switch whether to display the consumables management screen or another screen by an user operation of switching the page to be displayed.

(H) Any one of the plural pages may be configured to display a device management screen. The device management screen may be provided with device display areas of which number is equal to the number of at least one managed device. The device display areas may be configured to display information about the managed device corresponding to the device display area. When a particular user operation is performed for a specific device display area on the device management screen, the consumables management screen corresponding to consumables used in the managed device, which is corresponding to the specific device display area that is the target of the user operation, may be configured to be displayed.

By having the processing unit of the information processing device execute the management process using the management program configured in this way, when a particular user operation is performed on the equipment management screen targeting a specific equipment display area, the detailed screen corresponding to the consumables used in the managed device corresponding to the specific equipment display area targeted by the user operation is displayed. Therefore, the user can display the consumables management screen from the device management screen.

(I) The information processing device according to the present disclosures may have a part of or all of configurations corresponding to (A) through (H) above. Further, the information processing method according to the present disclosures may have a part of or all of configurations corresponding to (A) to (H) above.

What is claimed is:

1. A non-transitory computer-readable recording medium for an information processing device of an information processing system, the information processing device including a processor, a display and a communication device, the information processing system including at least one managed device configured to be managed by the information processing device, the managed device having at least one type of a consumable that needs to be replenished or replaced, the information processing device being configured to communicate with the managed device through the communication device, the recording medium containing computer-executable instructions which cause, when executed by the processor, the information processing device to perform managing the at least one type of consumable, wherein the managing includes:
obtaining, from the managed device, remaining amount information regarding a remaining amount of the consumable in use in the managed device;
obtaining, from an information source different from the managed device, stock amount information regarding a stock amount of an unused consumable from an information source in which the stock amount information is recorded;
when the consumable is replenished or replaced, determining whether or not the stock amount of the consumable is equal to or less than a threshold value that is defined as a determination criterion based on the remaining amount information and the stock amount information; and
displaying a consumables management screen displaying a status object indicating a status of the consumable that is determined, in the determining, that the stock amount is equal to or less than the threshold value.

2. The non-transitory computer-readable recording medium according to claim 1,
wherein, in the displaying, the consumables management screen is provided with a same number of consumable display areas as a number of at least one type of consumable; and
wherein the consumable display area is configured to display consumable information indicating the consumable corresponding to the consumable display area and the status object indicating the status of the consumable corresponding to the consumable display area.

3. The non-transitory computer-readable recording medium according to claim 2,
wherein, with respect to the consumable corresponding to the consumables display area, the consumables display area is configured to display, in correspondence with the consumables, at least one of an amount of consumables that are in use and need to be replaced in the managed device, an amount of unused consumables in stock, an amount of consumables in use in the managed device, a remaining amount of consumables in use in the managed device, and a model name of the managed device in which the consumables are being used.

4. The non-transitory computer-readable recording medium according to claim 3,
wherein, when a plurality of consumables and the same number of consumable display areas are displayed on the management screen in the displaying, the order in which the plurality of consumable display areas are displayed is configured so that the consumables with less stock amount after replacement, which is obtained by subtracting the amount of required replacements from the stock amount of the consumables, or less remaining amount are displayed with higher priority.

5. The non-transitory computer-readable recording medium according to claim 3,
wherein, when a particular user operation is performed for a specific consumable display area on the consumables management screen, a detailed screen showing details of the consumable corresponding to the specific consumable display area is displayed in the displaying; and
wherein the detailed screen is configured to display an appearance image representing an appearance of the specific consumable.

6. The non-transitory computer-readable recording medium according to claim 5,
wherein the detailed screen is configured to display a list of the managed devices using the consumables.

7. The non-transitory computer-readable recording medium according to claim 6,
wherein the detailed screen is configured to display the amount of consumables in use and the amount of consumables in stock.

8. The non-transitory computer-readable recording medium according to claim 5,
wherein, in the displaying, the display is configured to display one page selected from among a plurality of pages, the one page to be displayed being switchable by a user operation; and
wherein the consumables management screen is configured to be displayed on any one of the plurality of pages.

9. The non-transitory computer-readable recording medium according to claim 8,
wherein one of the plurality of pages is configured to display a device management screen;

wherein the management screen is provided with a same number of device display areas as the number of at least one managed device;
wherein the device display areas are configured to display information about the managed device corresponding to the device display area; and
wherein, when a particular user operation is performed for a specific device display area on the device management screen, the detailed screen corresponding to the consumables used in the managed device corresponding to the specific device display area targeted by the particular user operation is displayed.

10. An information processing device included in an information processing system, the information processing system further including at least one managed device, the information processing device including a processor, a display and a communication device, the information processing system including at least one managed device configured to be managed by the information processing device, the managed device having at least one type of a consumable that needs to be replenished or replaced, the information processing device being configured to communicate with the managed device through the communication device,
wherein the information processing device is configured to perform managing the consumables, the managing including:
obtaining, from the managed device, remaining amount information regarding a remaining amount of the consumable in use in the managed device;
obtaining, from an information source different from the managed device, stock amount information regarding a stock amount of an unused consumable from an information source in which the stock amount information is recorded;
when the consumable is replenished or replaced, determining whether or not the stock amount of the consumable is equal to or less than a threshold value that is defined as a determination criterion based on the remaining amount information and the stock amount information; and
displaying a consumables management screen displaying a status object indicating a status of the consumable that is determined, in the determining, that the stock amount is equal to or less than the threshold value.

11. An information processing method of controlling an information processing device included in an information processing system, the information processing system further including at least one managed device, the information processing device including a processor, a display and a communication device, the information processing system including at least one managed device configured to be managed by the information processing device, the managed device having at least one type of a consumable that needs to be replenished or replaced, the information processing device being configured to communicate with the managed device through the communication device, wherein the information processing method including managing the consumables, the managing including:
obtaining, from the managed device, remaining amount information regarding a remaining amount of the consumable in use in the managed device;
obtaining, from an information source different from the managed device, stock amount information regarding a stock amount of an unused consumable from an information source in which the stock amount information is recorded;
when the consumable is replenished or replaced, determining whether or not the stock amount of the consumable is equal to or less than a threshold value that is defined as a determination criterion based on the remaining amount information and the stock amount information; and
displaying a consumables management screen displaying a status object indicating a status of the consumable that is determined that the stock amount is equal to or less than the threshold value.

12. The information processing method according to claim 11,
wherein, in the displaying, the consumables management screen is provided with a same number of consumable display areas as a number of at least one type of consumable; and
wherein the consumable display area is configured to display consumable information indicating the consumable corresponding to the consumable display area and the status object indicating the status of the consumable corresponding to the consumable display area.

13. The information processing method according to claim 12,
wherein, with respect to the consumable corresponding to the consumables display area, the consumables display area is configured to display, in correspondence with the consumables, at least one of an amount of consumables that are in use and need to be replaced in the managed device, an amount of unused consumables in stock, an amount of consumables in use in the managed device, a remaining amount of consumables in use in the managed device, and a model name of the managed device in which the consumables are being used.

14. The information processing method according to claim 13,
wherein, when a plurality of consumables and the same number of consumable display areas are displayed on the management screen in the displaying, the order in which the plurality of consumable display areas are displayed is configured so that the consumables with less stock amount after replacement, which is obtained by subtracting the amount of required replacements from the stock amount of the consumables, or less remaining amount are displayed with higher priority.

15. The information processing method according to claim 13,
wherein, when a particular user operation is performed for a specific consumable display area on the consumables management screen, a detailed screen showing details of the consumable corresponding to the specific consumable display area is displayed in the displaying; and
wherein the detailed screen is configured to display an appearance image representing an appearance of the specific consumable.

16. The information processing method according to claim 15,
wherein the detailed screen is configured to display a list of the managed devices using the consumables.

17. The information processing method according to claim 16,
wherein the detailed screen is configured to display the amount of consumables in use and the amount of consumables in stock.

18. The information processing method according to claim 15, wherein, in the displaying, the display is configured to display one page selected from among a plurality of pages, the one page to be displayed being switchable by a user operation; and wherein the consumables management screen is configured to be displayed on any one of the plurality of pages.

19. The information processing method according to claim 18, wherein one of the plurality of pages is configured to display a device management screen;

wherein the management screen is provided with a same number of device display areas as the number of at least one managed device;

wherein the device display areas are configured to display information about the managed device corresponding to the device display area; and wherein, when a particular user operation is performed for a specific device display area on the device management screen, the detailed screen corresponding to the consumables used in the managed device corresponding to the specific device display area targeted by the particular user operation is displayed.

* * * * *